United States Patent [19]

Umehara

[11] 4,437,222
[45] Mar. 20, 1984

[54] METHOD OF MANUFACTURING TAPE GUIDES FOR RECORDING AND/OR REPRODUCING APPARATUS

[76] Inventor: Yozaburo Umehara, 2-8-6, Shakujiimachi, Nerima-ku, Tokyo, Japan

[21] Appl. No.: 293,991

[22] Filed: Aug. 18, 1981

Related U.S. Application Data

[60] Continuation-in-part of Ser. No. 76,827, Sep. 19, 1979, abandoned, which is a division of Ser. No. 940,198, Sep. 7, 1978, Pat. No. 4,228,940.

[30] Foreign Application Priority Data

Sep. 14, 1977 [JP] Japan .......................... 52-124344[U]
Mar. 3, 1978 [JP] Japan .................................. 53-24344

[51] Int. Cl.³ ............................................ B22D 11/126
[52] U.S. Cl. ...................................... 29/527.4; 242/76; 242/157 R; 226/196
[58] Field of Search ............. 242/76, 157 R; 226/195, 226/196, 197, 198, 199; 29/527.4, 527.2

[56] References Cited

U.S. PATENT DOCUMENTS

| 2,243,608 | 5/1941 | Schaurte ............................ 29/527.4 |
| 2,609,780 | 9/1952 | Whitbeck .......................... 29/527.4 |
| 3,787,229 | 1/1974 | Rudness .......................... 242/157 R |
| 3,843,035 | 10/1974 | Filterer et al. ........................ 242/76 |
| 4,062,484 | 12/1977 | Rausch et al. ........................ 242/76 |

Primary Examiner—Howard N. Goldberg
Assistant Examiner—V. K. Rising
Attorney, Agent, or Firm—Karl F. Ross; Herbert Dubno

[57] ABSTRACT

A method of making a tape guide pin or sleeve adapted to directly engage the back of recording tape or the like, comprises applying a surface layer of a nonmagnetic hard material on a base body of nonmagnetic material and then forming microscopic tips on the circumferential surface of the hard-surfacing layer such that the pattern of the microscopic tips extend substantially linearly in the transverse direction to the axial dimension of the pin or sleeve. These tips are then fine-finished and thereby rounded. The tape guide has improved wear-resistance and frictional characteristics by comparison with even tape guides free from the surface roughening formed by the microscopic tips.

15 Claims, 10 Drawing Figures

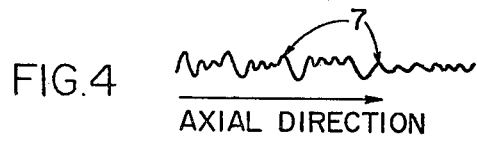
FIG.4  AXIAL DIRECTION
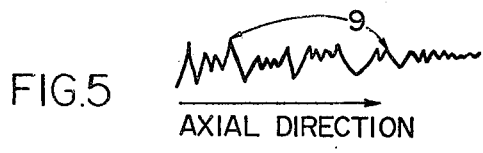
FIG.5  AXIAL DIRECTION
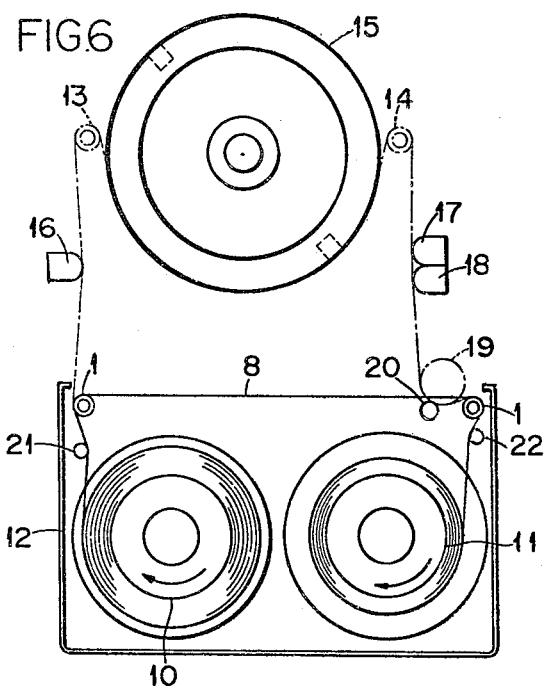
FIG.6

METHOD OF MANUFACTURING TAPE GUIDES FOR RECORDING AND/OR REPRODUCING APPARATUS

CROSS REFERENCE TO RELATED APPLICATIONS

The present application is a continuation-in-part of Ser. No. 076,827 filed Sept. 19, 1979 (now abandoned and replaced by Ser. No. 334,472 of Dec. 28, 1981) as a division of Ser. No. 940,198 of Sept. 7, 1978 (now U.S. Pat. No. 4,228,940) issued Oct. 21, 1980, and of which Ser. No. 190,755 filed Sept. 25, 1980, (now U.S. Pat. No. 4,313,551 of Feb. 21, 1982) and also copending herewith is another division.

FIELD OF THE INVENTION

My present invention relates to a method of making a tape guide for recording and/or reproducing apparatus, and, more particularly, for forming the guide sleeve against which a tape for a recording or reproducing apparatus is deflected or urged.

BACKGROUND OF THE INVENTION

Generally a video-tape recorder (VTR) includes a tape cassette in which a magnetic tape is wound on reels. In practically all such recorders and video-tape playback units end even sound-recording tape units, the tape is guided by a tape guide pin during the recording or reproducing operation.

The tape guide pin is important from the point of view of providing accurate running of the magnetic tape and is generally contacted by the back surface of the tape, the recording medium being applied to the other surface thereof. The quality of tape guide pins, therefore, greatly influences the performance of the recorder or reproducing apparatus.

Most of the tape guide pins used in present day video-tape recorders are made of austenitic stainless steel, such as the stainless steel SUS 316 of the Japanese industrial standard. The structure of this metal may be partially changed from austenite into a pseudo martensite by working processes such as plastic deformation, cutting and grinding and the material, which should be totally nonmagnetic, may develop a weak magnetic character. Magnetic tape guide pins are detrimental to the quality of the signal reproduction and have detrimental effects on the video signals on the tape as well.

In earlier tape guide systems, moreover, the surface and contact with the tape was soft and readily worn causing damage or scratching of the tape which slides upon the pin. This, of course, shortens the life of the tape.

OBJECTS OF THE INVENTION

It is the principal object of the present invention to provide an improved method of making a tape guide whereby the disadvantages of earlier tape guides are obviated.

Another object of the invention is to provide a method of making a tape guide which extends the principles of the aforedescribed copending applications.

SUMMARY OF THE INVENTION

The method of the present invention obviates the disadvantages of earlier tape guides by forming a base body of a nonmagnetic material and coating this base body with a surface layer of a nonmagnetic hard-facing material. Thereafter, microscopic tips or projections are intentionally formed on the circumferential surface of the hard-facing layer so that the pattern of the microscopic tips extends substantially linearly in a direction transverse to the axial direction of the tape guide and, finally, these tips are rounded by a fine-finishing process.

In a totally unexpected way, the intentional roughening of the surface by the formation of microscopic tips and the subsequent rounding of these tips provides a highly uniform contact of the back of the tape with the guide and eliminates any tendency to scratch or frictional interaction between the tape and the guide which are detrimental to the tape.

Thus, by contrast with earlier methods which tend to make the surface of the tape guide as smooth as possible, the present invention intentionally forms microscopic tips in order to decrease the frictional reaction between the tape and the guide and in addition rounds the microscopic tips by a fine-finishing process in a manner which avoids damaging the tape but precludes disappearance of these tips.

According to another feature of the invention, the microscopic tips are formed and rounded by an outer-diameter grinding of the circumferential surface of a tape guide pin or sleeve by a centerless grinding method, an abrasive wheel being used which preferably consists of boron carbide particles with graded grit, especially when the hard-finishing layer is a hard chromium surface.

The particle size or grit size of the wheel gradually decreases axially therealong from about 240 mesh to 1000 mesh (corresponding to the concentration of about 90 to 100). The tape guide pin is advanced along the surface of the wheel in the axial direction from the larger particle size area to the smaller one and thus microscopic tips can be provided by the scratching action of the smaller grit particles of the wheel.

The microscopic tips can be formed in a number of process runs, i.e. by repetition of the method set forth.

The tips can then be rounded.

In this specification, the "hard material" of the surface layer shall have a hardness which is greater than that of the base body. A recording and/or reproducing apparatus as referred to herein can be a video-tape recorder, a tape cassette adapted to be loaded into such a recorder, or some other recorder utilizing a tape medium.

BRIEF DESCRIPTION OF THE DRAWING

The above and other objects, features and advantages of the present invention will become more readily apparent from the following description, reference being made to the accompanying drawing in which:

FIG. 4 is a schematic and microscopic view of a pattern of the surface roughness of the tape guide pin according to the embodiment of this invention, measured by a surface roughness meter;

FIG. 5 is a schematic and microscopic view of a pattern of the surface roughness of a conventional tape guide pin, measured by the surface roughness meter;

FIG. 6 is a schematic plan view of a video-tape recorder to which the tape guide pin according to the embodiment of this invention is applied.

SPECIFIC DESCRIPTION

According to this invention, a base body of a tape guide is made of perfectly nonmagnetic material such as austenitic stainless steel SUS 316. The base body of the tape guide means is plated with nonmagnetizable metal or a metal which is hard to magnetize, such as chromium, so as to form a hard metal surface layer on the base body of the tape guide means. The nonmagnetic base body of the tape guide means may be soft. However, the surface layer of the tape guide means should be hard. The tape guide means is of double-layer structure. The surface of the tape guide means is ground (outer-diameter grinding), and then it is so burnished as to round the microscopic tips of the surface roughness as the fine-finishing step. Thus, the frictional resistance between the tape guide means and the magnetic tape sliding thereon is reduced.

According to this invention, the magnetic tape smoothly slides on the tape guide means in contact with the rounded tips of the surface roughness. Damage to or scratching of the back surface of the magnetic tape or the magnetic film thereof is thus effectively avoided. With conventional tape guide means, the microscopic tips of the surface roughness are pointed or peaked so as to cause damage to the magnetic tape sliding thereon. When the microscopic tips of the surface roughness are squashed or smashed by the burnishing operation, they become worn down through contact with the running magnetic tape inasmuch as the conventional tape guide means is made of relatively soft material. Accordingly, the microscopic tips of the surface roughness are edged, peaked or pointed by the running magnetic tape, resulting in damage to the latter. Further, hard dust is apt to adhere to the microscopic flat surfaces of the surface roughness formed by wearing, similarly resulting in damage to the magnetic tape.

On the other hand, according to this invention, since the surface layer is made of hard material, and the microscopic tips of the surface roughness are rounded, the microscopic tips are hard to wear. This is because the magnetic tape always makes smooth contact with the tape guide means and slides smoothly.

If the microscopic tips of the surface roughness are not rounded, or are flat, the magnetic tape would be damaged by the hard edges of the surface roughness, or dust is apt to adhere to the flat tips of the surface roughness.

Moreover, since the base body of the tape guide means is made of nonmagnetic material, and the outer layer is made of substantially nonmagnetic hard material, the tape guide means according to this invention has little influence on the video signals on the magnetic tape.

Figure 1A:
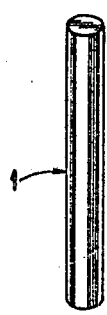
FIGS. 1A, 1B and 1C are perspective views of tape guide pins according to three embodiments of this invention.
Figure 1B:
Figure 1C:
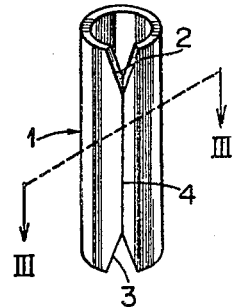

The tape guide means according to this invention may be in the form of a solid rod, a pipe or a rolled piece as shown in FIG. 1A, FIG. 1B or FIG. 1C. Besides the above described stainless steel, austenitic stainless steel SUS 304, aluminum alloy or copper alloy may be used as nonmagnetic material for the base body of the tape guide. The surface layer may be made of any other nonmagnetic material than chromium. However, it is required for the smooth running of the tape that the Vickers hardness of the surface layer be higher than 400 Hv, i.e. should be within the range of 400 to 1000 Hv (preferably 600 to 700 Hv). Beyond the above-described range of the Vickers hardness, the running performance of the magnetic tape tends to deteriorate. When the Vickers hardness is too high, the magnetic tape is rather damaged by the tape guide. It is preferable that the surface roughness of the hard surface layer after the outer-diameter grinding be within the range of 0.2 to 0.6 S (according to JIS-Japanese Industrial Standards-B0601-1970: the same shall apply hereinafter). The range of 0.2 to 0.6 S means that the maximum height of the surface-roughness formations is the range of 0.2 to 0.6 $\mu$Rmax in the metric system. When the surface roughness of the surface layer of the tape guide is less than 0.2 $\mu$Rmax, the microscopic surface is too flat, and the smooth running of the magnetic tape is apt to be difficult. When the surface roughness of the surface layer of the tape guide means is more than 0.6 $\mu$Rmax, the microscopic tips of the surface roughness are too sharp, and the magnetic tape is apt to be damaged by the sharp tips of the surface roughness.

The shapes of the tape guides usable in the VTR are shown in FIG. 1A, FIG. 1B and FIG. 1C. FIG. 1A shows a tape guide pin 1 in the form of a solid rod. FIG. 1B shows a tape guide pin 1 in the form of a pipe; and FIG. 1C shows a tape guide pin 1 in the form of a rolled piece. V-shaped cutout portions 2 and 3 are made in the upper and lower ends of the tape guide pin 1 shown in FIG. 1C. The tape guide pin of FIG. 1C is formed by rolling a sheet material shown in FIG. 2A. The sheet material is cut at the four corners corresponding to the V-shaped cutout portions 2 and 3. Opposite edges 4a and 4b are abutted with each other in the rolling operation of the sheet material. An abutting surface 4 between the edges 4a and 4b can be easily recognized by the V-shaped cutout portions 2 and 3.

Figure 2A:
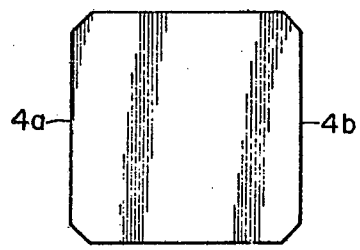
FIG. 2A is a plan view of a sheet material for the tape guide pin of FIG. 1C.
Figure 2B:
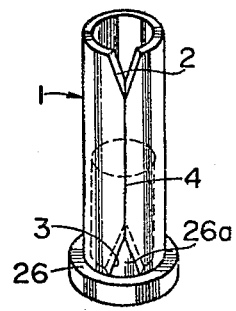
FIG. 2B is a perspective view of the tape guide pin of FIG. 1C fitted to a guide post in a tape cassette in a video-tape recorder.

The tape guide pin 1 of FIG. 1C is firmly fitted at one of the V-shaped cutout portions 2 and 3 to a triangular projection 26a of a tape guide post 26 formed on a tape cassette in the VTR, as shown in FIG. 2B, in the assembling operation.

Since the cutout portions 2 and 3 are made at both ends of the tape guide pin 1 of FIG. 1C, it is not necessary to distinguish the ends of the tape guide pin 1 in the automatic assembling operation.

Preferably, the tape guide pin 1 of FIG. 1C is so arranged in the tape cassette that any portion of the tape guide pin 1 other than the abutting surface 4 thereof contacts the magnetic tape. The tape guide pin 1 of FIG. 1C is plated with hard chromium as described below. However, even the tape guide pin 1 of FIG. 1C not plated with hard chromium has the above-described merits. The cutout portions 2 and 3 may be in any shape other than V-shape. For example, the cutouts may be rectangular.

Figure 3:
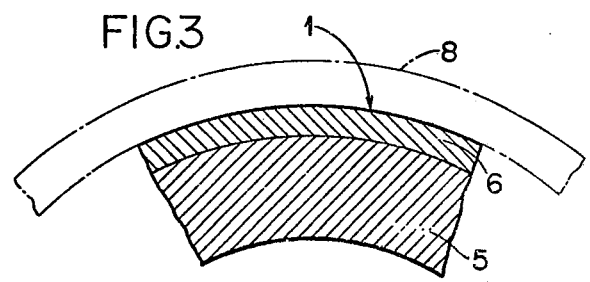
FIG. 3 is an enlarged cross-sectional view of a part of the tape guide pin of FIG. 1C, taken along the line III—III of FIG. 1C.

An internal structure of the tape guide pin 1 of FIG. 1C is shown in FIG. 3 which is an enlarged cross-sectional view of the tape guide pin 1 taken along the line III—III of FIG. 1C. A base body 5 of the tape guide pin 1 is made of nonmagnetic austenitic stainless steel, for example, SUS 316 which includes less than 0.08% C, 16-18% Cr, 10-14% Ni and 2-3% Mo. The structure of the stainless steel SUS 316 is originally in austenite. However, it has the possibility to change from austenite into pseudo-martensite by a working operation. The pseudo-martensite is magnetic. The stainless steel SUS 316 is nonmagnetic only below the working degree of 40% and tensile strength of 122 kg/mm$^2$. When the tape guide pin of the stainless steel SUS 316 is worked beyond the working degree of 40%, the stainless steel SUS 316 changes from non-magnetic material into feebly magnetic material. For demagnetizing the tape guide pin, it is heated to a temperature higher than about 1050° C. to render austenite structure into solid solution. However, in such heat treatment, the stainless steel is softened to the Vickers hardness of 200 Hv, and it becomes easy to wear by friction. Such a tape guide is not usable. According to the embodiments of this invention, a hard chromium layer 6 is formed on the base body 5 to increase the surface hardness of the tape guide pin 1. The layer 6 has the hardness of more than 600 Hv. The surface of the tape guide pin 1 which has been treated as described hereinafter, is so treated as to have the microscopic roughness shown in FIG. 4. The hardness of of the electroplate layer 6 can be controlled with current density of electroplating bath, temperature thereof, and the distance between the electrodes in the electroplating bath. The pattern of the surface roughness as shown in FIG. 4 is not always continuous in the axial direction of the tape guide pin 1. Although not shown, some of the microscopic tips of the surface roughness are nearly perpendicular to the axial direction, or inclined to the axial direction.

The tape guide pin 1 of FIG. 1A or FIG. 1B is obtained by cutting a long stainless steel material whereas the tape guide pin of FIG. 1C is obtained by rolling the stainless steel sheet material of FIG. 2A. Next, the circumferential surface of the tape guide pin 1 is ground (outer-diameter grinding), for example, by a centerless grinding method, and it is lapped. It is required that the surface roughness of the tape guide pin 1 be lower than about 0.6 μRmax is this manufacturing stage. It is moreover preferable that the surface roughness of the tape guide pin be lower than 0.3 μRmax. In the centerless grinding method, the tape guide pin 1 is ground between a rotating abrasive wheel and another rotating rubber wheel, running along the support arranged in the space between the rotating abrasive wheel and the rotating rubber wheel. The tape guide pin 1 to be ground runs through the stretch of the support for above ten seconds, being ground by the rotating rubber wheel and the rotating abrasive wheel which rotate at the speed ratio of ⅓~¼ in the same direction. For example, the rotational speed of the abrasive wheel is about 1500 r.p.m, while that of the rubber wheel is about 500 r.p.m. The tape guide pin 1 is supplied to one end of the support between the rubber wheel and the abrasive wheel, and it is discharged from another end of the support. The tape guide pin 1 is once or twice introduced to the support.

Next, the tape guide pin 1 is heated up at a temperature of 1050° C. for demagnetization. The structure of the base body 5 then becomes perfectly non-magnetic austenite. The chromium electroplate layer 6 having a hardness of more than 600 Hv is formed on the base body 5 to the depth of 1 to 10μ or preferably 4 to 7μ. Thus, there is obtained a perfectly non-magnetic tape guide pin 1 consisting of the base body 5 with hardness of less than 200 Hv and the surface layer 6 with hardness of more than 600 Hv. Further, the circumferential surface of the tape guide pin 1 is so ground by the centerless grinding method that the surface roughness of the tape guide pin 1 becomes 0.6 to 0.2μ Rmax, or considerably lower than 0.5 μRmax. Then, the microscopic tips of the surface roughness of the tape guide pin 1 are rounded by a barrel grinding method (particularly for a surface roughness of lower than 0.5 μRmax), a buffing method, and a chemical polishing or burnishing method as a fine-finishing step, while the surface roughness of the tape guide pin 1 is maintained at the value of 0.6 to 0.2 μRmax, as shown in FIG. 4. The circumferential surface of the tape guide pin 1 is not perfectly ground by the above described method, since the microscopic tips of the surface roughness are merely rounded.

For example, a rotary drum containing abrasives is used in the barrel grinding method, with a cloth roll with abrasives is used in the buffing method. In both of these methods, it is preferable that the finishing grind time of the tape guide pin 1 be one eighth to one fifteenth as long as the time required to perfectly grind the tape guide pin 1. When the finishing grind time of the tape guide pin 1 is too short, the microscopic tips of the surface roughness are not sufficiently rounded. On the other hand, when the finishing grind time of the tape guide pin 1 is too long, the microscopic tips of the surface roughness are flattened. One or the other result is not desirable.

The thus manufactured tape guide pin 1 has no adverse effect on the signals recorded on the magnetic tape, since the tape guide pin 1 is perfectly nonmagnetic. The surface layer of the tape guide pin 1 is so hard such that it has a Vickers hardness of higher than 600 Hv. The microscopic tips of the surface roughness are rounded as shown by reference numeral 7 in FIG. 4. Accordingly, the sliding frictional resistance between the magnetic tape 8 shown by the dot-dash line in FIG. 3 and the tape guide pin 1 is very little, and the running magnetic tape is hard to wear out. The microscopic tips of the surface roughness of the conventional tape guide pin 1 are pointed or sharpened as shown by reference numeral 9 in FIG. 5. Accordingly, when the conventional tape guide pin is used, scratch damage is observed in the magnetic tape 8, before the running number of the magnetic tape 8 becomes ten in the VTR. On the other hand, when the tape guide pin 1 according to this invention is used, scratch damage is not observed in the magnetic tape 8, even when the running number of the magnetic tape 8 becomes more than ten. The life of the magnetic tape 8 is prolonged.

FIG. 6 is a schematic plan view of the VTR in which the tape guide pins 1 according to this invention are assembled into a tape cassette. Referring to FIG. 6, the magnetic tape 8 from a supply reel 10 runs through tape guide pins 21, 1 and 22 to a take-up reel 11 to be taken up by the latter. In the loading condition, the magnetic tape 8 is applied to a rotary drum assembly 15 by loading poles 13 and 14 in the manner shown by the dot-dash line in FIG. 6. The tape 8 contacts also with a full-width erasing head 16, a sound-erasing head 17 and a sound control head 18, and it is pressed between a pinch roller 19 and a capstan 20 to be driven thereby, as is well known.

As above described, the surface layer of the tape guide pin 1 is made of hard chromium electroplate, and it has the surface roughness as shown in FIG. 4. The magnetic tape 8 is guided by the tape guide pin 1, sliding thereon. The tape guide pin 21 at the supply reel side contacts the magnetic film of the magnetic tape 8, while the tape guide pin 1 contacts the non-magnetic back surface of the magnetic tape 8. When the tape guide pin 21 is manufactured in the same manner as the tape guide pin 1 the magnetic tape 8 is not damaged by the tape guide pin 21. The conventional tape guide pin damages particularly the magnetic film of the magnetic tape. Such defect can be avoided by the tape guide pin according to this invention. The tape guide pin 22 at the take-up reel side does not always need to be manufactured in the same manner as the tape guide pin 1 according to this invention. For example, the tape guide pin 22 may be manufactured in such a manner that a pipe formed of plastics is fitted to a non-magnetic guide post.

Figure 7:
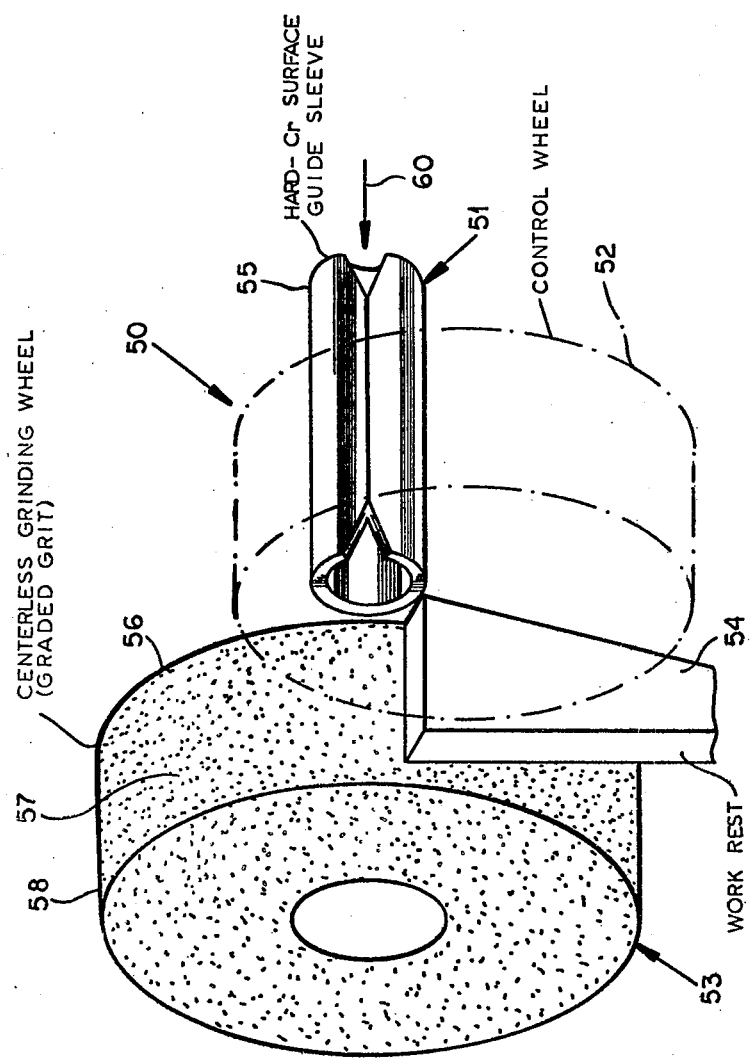
FIG. 7 is a diagrammatic perspective view illustrating a centerless grinding apparatus for carrying out the method of the present invention.

As will be apparent, the tips are formed on the hard-chromium surface layer 55 of the guide sleeve 51 by advancing this sleeve in the direction of arrow 60 on a work rest 54 between the driven control wheel 52 and a centerless grinding wheel 53 of a centerless grinding apparatus diagrammatically shown at 50 in FIG. 7.

The circumferential surface of the grinding wheel has its grit graded from one axial end to the other so that, for example, the larger or coarser grit is found at 56 while grit of an intermediate particle size grit is found at 57 and small diameter grit is found at 58 along the wheel.

The wheel is composed of boron carbide particles when the hard-surface layer is made of hard chromium and the particle size of the grit in the direction of the guide sleeve gradually decreases from 240 mesh to 1000 mesh, the guide pin being advanced from the larger particle size area to the smaller particle size area.

The circumferential surface of the guide sleeve or pin is somewhat flattened by the contact of the wheel with the sleeve and the microscopic tips are formed by the smaller grit.

The fine finishing being carried out in the manner described, by barrel grinding, by buffing, burnishing or by chemical polishing. The surface thickness of the hard-facing layer should be 1 to 10 microns.

The surface layer 6 may also be formed on the base body 5 by any method other than the electroplating method. Further, the surface layer 6 and the base body 5 may be made of the same material. Although the surface treatment for dimensional accuracy of circumferential surface is carried out both before the electroplating operation and after the electroplating operation in the above-described embodiment, it may be carried out only before or after the electroplating operation. Further, although the above-described tape guide pin is circular in cross section, it may be different, for example, semicircular in cross section. This invention may be applied to any recording and/or reproducting apparatus other than the video tape recorder, for example, it may be applied to a projector in which a film corresponds to the tape.

I claim:

1. A method of manufacturing a tape guide for tape cassette of a recording or reproducing apparatus, comprising the steps of:
   (a) forming a base body of nonmagnetic material having a cylindrical surface;
   (b) applying a surface layer of nonmagnetic hard material to said base body along said cylindrical surface;
   (c) forming microscopic tips on said layer with the pattern of said tips extending substantially linearly in a direction transverse to the axial direction of said body so that said layer will have a surface roughness of 0.2 to 0.6 $\mu$Rmax; and
   (d) fine-finishing the microscopic tips to round the same while substantially maintaining said surface roughness.

2. The method defined in claim 1 wherein the microscopic tips are formed on said layer by subjecting the body provided with said layer to centerless grinding having a grinding wheel with graded grit decreasing in particle size axially in a direction of feed of said body past said wheel, the grit size along the wheel ranging from about 240 mesh to 1000 mesh.

3. The method defined in claim 2 wherein said layer consists of hard chromium, said wheel is provided with abrasive particles of boron carbide, and said base body is composed of an aluminum, copper or stainless steel alloy.

4. The method defined in claim 3 wherein said layer is formed on said base body by electroplating.

5. The method defined in claim 4 wherein the Vickers hardness layer is 400 to 1000 Hv.

6. The method defined in claim 5 wherein said fine-finishing is carried out by barrel grinding.

7. The method defined in claim 5 wherein the fine-finishing is carried out by buffing.

8. The method defined in claim 5 wherein said fine-finishing is carried out by burnishing.

9. The method defined in claim 5 wherein the fine-finishing is carried out by chemical polishing.

10. The method defined in claim 6, claim 7, claim 8 or claim 9 wherein said surface layer has a thickness of 1 to 10 microns.

11. A method of forming a tape guide for a tape cassette of a recording or reproducing apparatus, said method comprising the steps of:
    (a) forming a nonmagnetic base body of stainless steel, copper or aluminum with a cylindrical surface by rolling said body from a generally rectangular sheet having truncated corners so that opposite edges of said sheet abut on another;
    (b) applying to said cylindrical surface a nonmagnetic layer having a thickness of 1 to 10 microns of a hard-surface material having a Vickers hardness of 400 to 1000 Hv;
    (c) subjecting said layer to centerless grinding to form microscopic tips in said layer and impart a surface roughness of 0.2 to 0.6 $\mu$Rmax to said layer; and
    (d) rounding said tips while substantially maintaining said surface roughness.

12. The method defined in claim 11 wherein said microscopic tips are rounded by barrel grinding.

13. The method defined in claim 11 wherein said microscopic tips are rounded by burnishing.

14. The method defined in claim 11 wherein said microscopic tips are rounded by buffing.

15. The method defined in claim 11 wherein said microscopic tips are rounded by chemical polishing.

* * * * *